US011403856B2

(12) United States Patent
Parchami et al.

(10) Patent No.: US 11,403,856 B2
(45) Date of Patent: Aug. 2, 2022

(54) GROUP OBJECT-TRACKING

(71) Applicant: Ford Global Technologies, LLC, Dearborn, MI (US)

(72) Inventors: Mostafa Parchami, Dearborn, MI (US); Faizan Shaik, Ann Arbor, MI (US); Stephen Giardinelli, Ypsilanti, MI (US); Gintaras Vincent Puskorius, Novi, MI (US); Enrique Corona, Canton, MI (US); Kunjan Singh, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/003,301

(22) Filed: Aug. 26, 2020

(65) Prior Publication Data
US 2022/0067407 A1   Mar. 3, 2022

(51) Int. Cl.
*G06K 9/62* (2022.01)
*G06V 20/58* (2022.01)
(Continued)

(52) U.S. Cl.
CPC ......... *G06V 20/584* (2022.01); *G06K 9/6215* (2013.01); *G06K 9/6218* (2013.01); *G06T 7/73* (2017.01); *G06V 40/103* (2022.01)

(58) Field of Classification Search
CPC .......... G06K 9/00825; G06K 9/00369; G06K 9/6215; G06K 9/6218; G06T 7/73
See application file for complete search history.

(56) References Cited

U.S. PATENT DOCUMENTS 9,014,422 B2    4/2015  Perbet et al.
10,645,344 B2 *  5/2020  Marman .......... G08B 13/19608
(Continued)

FOREIGN PATENT DOCUMENTS

CN    104182747 A1    12/2014
CN    110636248 A  *  12/2019

OTHER PUBLICATIONS

Yang et al., "Second-Order Extended Kalman Filter for Extended Object and Group Tracking", arXiv:1604.00219v1 [cs.SY] Apr. 1, 2016.

*Primary Examiner* — Matthew C Bella
*Assistant Examiner* — Kathleen M Broughton
(74) *Attorney, Agent, or Firm* — Frank A. MacKenzie; Bejin Bieneman PLC

(57) ABSTRACT

A system, including a processor and a memory, the memory including instructions to be executed by the processor to identify first object features from sensor data acquired by a stationary sensor at a first time step, determine second object features at a second time step. The instructions can include further instructions to determine one or more object clusters of first object features by determining distances measured in pixels between the first object features and corresponding second object features and comparing the distances to one or more mean distances and determine one or more object groups of inlier first object features in the one or more object clusters by determining a plurality of similarity transformations for a plurality of random samples of first object features and determining inlier first object features based on maximizing the number of first object features included in a similarity transformation.

20 Claims, 6 Drawing Sheets

(51) Int. Cl.
*G06T 7/73* (2017.01)
*G06V 40/10* (2022.01)

(56) References Cited

U.S. PATENT DOCUMENTS

| | | |
|---|---|---|
| 2012/0134541 A1 | 5/2012 | Hara |
| 2017/0011520 A1* | 1/2017 | Mathew ............... G06K 9/6232 |
| 2019/0180077 A1* | 6/2019 | Zhou .................. H04N 5/23218 |
| 2019/0258878 A1* | 8/2019 | Koivisto ................ G06N 3/084 |
| 2020/0005468 A1* | 1/2020 | Paul ..................... G06K 9/6274 |
| 2020/0191943 A1* | 6/2020 | Wu ....................... G01S 13/003 |

* cited by examiner

GROUP OBJECT-TRACKING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
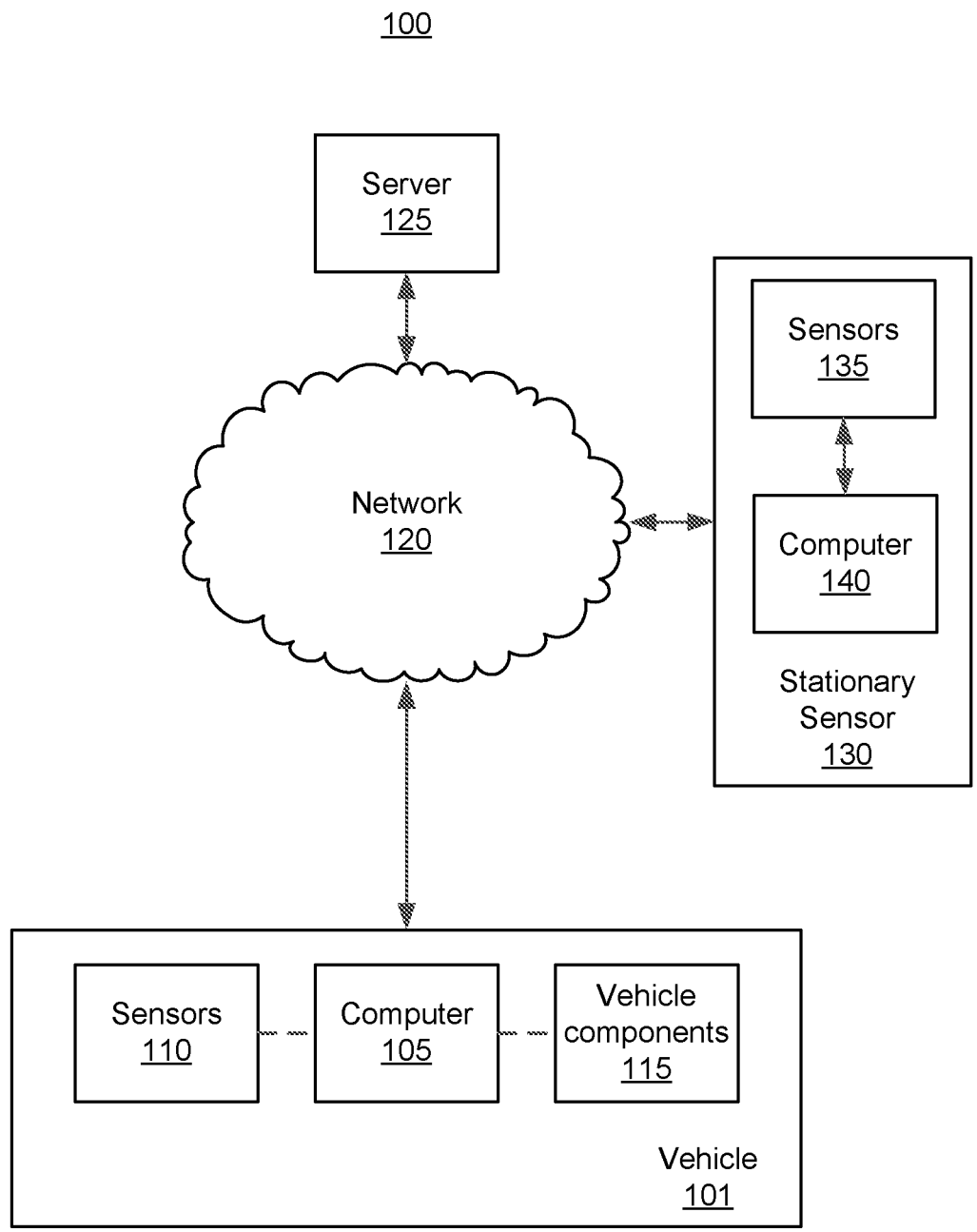
FIG. 1 is a diagram of an example traffic infrastructure system.

Vehicles can be equipped to operate in both autonomous and occupant operated mode. By a semi- or fully-autonomous mode, we mean a mode of operation wherein a vehicle can be operated partly or entirely by a computing device as part of a system having sensors and controllers. The vehicle can be occupied or unoccupied, but in either case the vehicle can be partly or completely operated without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

Data regarding the location of moving objects in an environment around a vehicle can be acquired by stationary sensors that communicate with computing devices included in a traffic infrastructure system. The stationary sensors, including video and lidar sensors, can acquire data regarding a traffic scene and transmit the data to a computing device. The computing device can process the data to identify and locate objects, including pedestrians and vehicles, for example, and communicate data regarding the identified and located objects to a vehicle. The vehicle can combine the data regarding the identity and location of objects with data acquired from sensors included in the vehicle to determine a vehicle path upon which to operate the vehicle. The vehicle path can be determined based on avoiding contact with objects in an environment around the vehicle.

Obtaining accurate and timely data regarding the movement of objects, including vehicles and pedestrians, in an environment around a vehicle can permit a computer included in the vehicle to predict future locations of the objects. A problem with determining movement of objects is presented by groups of pedestrians. Groups of pedestrians can include sub-groups, each moving in different directions and speeds. Because the sub-groups can overlap, determining direction and speed of individual pedestrians in a group can require a large amount of computing resources. In addition, because pedestrians in a group can be partially occluding and becoming visible, tracking individual pedestrians can be highly inaccurate. Techniques described herein improve the accuracy of tracking pedestrians in a group and reduce required computer resources by determining sub-groups of objects including pedestrians and tracking the sub-groups based on speed and direction of motion of the subgroups.

Disclosed herein is method including identifying first object features from sensor data acquired by a stationary sensor at a first time step, determining second object features at a second time step, determining one or more object clusters of first object features by determining distances measured in pixels between first object features and corresponding second object features and comparing the distances to one or more mean distances. The one or more object groups of inlier first object features in the one or more object clusters can be determined by determining a plurality of similarity transformations for a plurality of random samples of first object features and determining inlier first object features based on maximizing a number of first object features included in a similarity transformation, wherein the similarity transformation measures translation, rotation, and scaling that transforms a set of first object features into a set of second object features. Tracking data for the one or more object groups can be determined based on locations of the object groups and the tracking data for the second object cluster can be provided to a vehicle. The sensor data can include video data and lidar data. A time difference between the first time step and the second time step can be based on a video frame rate. The one or more object clusters can correspond to one or more pedestrians or one or more vehicles. Object features can be determined by processing sensor data with an ORB feature detector, wherein the ORB feature detector is a machine vision technique that includes detecting corner features and determining an orientation for the corner features.

The object cluster can be determined by calculating a k-nearest neighbor algorithm on the distances, wherein the k-nearest neighbor algorithm assigns an object feature to the object cluster based on its distance and nearest neighbor. The object cluster can be determined based on a minimum cluster size and a maximum distance between first and second object feature. The location of the object features can be determined by determining the locations of the one or more object features by determining one or more convex hulls for the object and fitting enclosing ellipses to the convex hulls. Tracking data for the object features can be determined by determining locations of the enclosing ellipses in successive frames of sensor data and filtering the locations with one or more of a particle filter or a Kalman filter. The tracking data for the one or more object groups can be downloaded to a second computing device included in the vehicle. The tracking data for the one or more object groups can be used to by the second computing device to operate the vehicle. Operating the vehicle can include using the tracking data to predict locations for the one or object groups and operating the vehicle to avoid contact with the one or more object groups. The inlier first object features are determined based on a RANSAC algorithm, wherein the RANSAC algorithm can include determining a similarity transform based on a random sample of object features. The inlier first object features can be determined by matching first object features with second object features based on the similarity transform based on a random sample of object features.

Further disclosed is a computer readable medium, storing program instructions for executing some or all of the above method steps. Further disclosed is a computer programmed for executing some or all of the above method steps, including a computer apparatus, programmed to identify first object features from sensor data acquired by a stationary sensor at a first time step, determine second object features at a second time step, determine one or more object clusters of first object features by determining distances measured in pixels between first object features and corresponding second object features and compare the distances to one or more mean distances. The one or more object groups of inlier first object features in the one or more object clusters can be determined by determining a plurality of similarity transformations for a plurality of random samples of first object features and determining inlier first object features based on maximizing a number of first object features included in a similarity transformation, wherein the similarity transformation measures translation, rotation, and scaling that transforms a set of first object features into a set of second object features. Tracking data for the one or more object groups can be determined based on locations of the object groups and the tracking data for the second object cluster can be provided to a vehicle. The sensor data can include video data and lidar data. A time difference between the first time step and the second time step can be based on a video frame rate. The one or more object clusters can correspond to one or more pedestrians or one or more vehicles. Object features can be determined by processing sensor data with an ORB feature detector, wherein the ORB feature detector is a machine vision technique that includes detecting corner features and determining an orientation for the corner features.

The computer can be further programmed to determine the object cluster by calculating a k-nearest neighbor algorithm on the distances, wherein the k-nearest neighbor algorithm assigns an object feature to the object cluster based on its distance and nearest neighbor. The object cluster can be determined based on a minimum cluster size and a maximum distance between first and second object feature. The location of the object features can be determined by determining the locations of the one or more object features by determining one or more convex hulls for the object and fitting enclosing ellipses to the convex hulls. Tracking data for the object features can be determined by determining locations of the enclosing ellipses in successive frames of sensor data and filtering the locations with one or more of a particle filter or a Kalman filter. The tracking data for the one or more object groups can be downloaded to a second computing device included in the vehicle. The tracking data for the one or more object groups can be used to by the second computing device to operate the vehicle. Operating the vehicle can include using the tracking data to predict locations for the one or object groups and operating the vehicle to avoid contact with the one or more object groups. The inlier first object features are determined based on a RANSAC algorithm, wherein the RANSAC algorithm can include determining a similarity transform based on a random sample of object features. The inlier first object features can be determined by matching first object features with second object features based on the similarity transform based on a random sample of object features.

FIG. 1 is a diagram of a traffic infrastructure system 100 that includes a vehicle 101 operable in autonomous ("autonomous" by itself in this disclosure means "fully autonomous"), semi-autonomous, and occupant operated (also referred to as non-autonomous) mode. One or more vehicle 101 computing devices 105 can receive data regarding the operation of the vehicle 100 from sensors 110. The computing device 105 may operate the vehicle 101 in an autonomous mode, a semi-autonomous mode, or a non-autonomous mode.

The computing device 105 includes a processor and a memory such as are known. Further, the memory includes one or more forms of computer-readable media, and stores instructions executable by the processor for performing various operations, including as disclosed herein. For example, the computing device 105 may include programming to operate one or more of vehicle brakes, propulsion (e.g., control of acceleration in the vehicle 101 by controlling one or more of an internal combustion engine, electric motor, hybrid engine, etc.), steering, climate control, interior and/or exterior lights, etc., as well as to determine whether and when the computing device 105, as opposed to a human operator, is to control such operations.

The computing device 105 may include or be communicatively coupled to, e.g., via a vehicle communications bus as described further below, more than one computing devices, e.g., controllers or the like included in the vehicle 101 for monitoring and/or controlling various vehicle components 115, e.g., a powertrain controller, a brake controller, a steering controller, etc. The computing device 105 is generally arranged for communications on a vehicle communication network, e.g., including a bus in the vehicle 101 such as a controller area network (CAN) or the like; the vehicle 101 network can additionally or alternatively include wired or wireless communication mechanisms such as are known, e.g., Ethernet or other communication protocols.

Via the vehicle network, the computing device 105 may transmit messages to various devices in the vehicle and/or receive messages from the various devices, e.g., controllers, actuators, sensors, etc., including sensors 110. Alternatively, or additionally, in cases where the computing device 105 actually comprises multiple devices, the vehicle communication network may be used for communications between devices represented as the computing device 105 in this disclosure. Further, as mentioned below, various controllers or sensing elements such as sensors 110 may provide data to the computing device 105 via the vehicle communication network.

In addition, the computing device 105 may be configured for communicating through a vehicle-to-infrastructure (V-to-I) interface with a server 125, e.g., a cloud server or remote server computer, via a network 120, which, as described below, includes hardware, firmware, and software that permits computing device 105 to communicate with a server 125 via a network 120 such as wireless Internet (WI-FI®) or cellular networks. Computing device 105 may be configured accordingly including processors, memory, transceivers, etc., configured to utilize various wired and/or wireless networking technologies, e.g., cellular, BLUETOOTH® and wired and/or wireless packet networks. Computing device 105 may be configured for communicating with other vehicles 101 using vehicle-to-vehicle (V-to-V) networks, e.g., according to Dedicated Short Range Communications (DSRC) and/or the like, e.g., formed on an ad hoc basis among nearby vehicles 101 or formed through infrastructure-based networks via V-to-I communications. The computing device 105 also includes nonvolatile memory such as is known. Computing device 105 can log data by storing the data in nonvolatile memory for later retrieval and transmittal via a vehicle communication network to a server 125 or a user mobile device. Server computer 125 can also function as a computing device 105 included in a roadside infrastructure, or edge, computing node, where an edge computing node is a computing device 105 included in or on a stationary infrastructure element such as a pole, a bridge, a wall, building, etc., and that acquires sensor data and communicates with vehicles 101 via a V-to-I interface or the like in a local portion of one or more of a roadway, parking lot or parking structure, etc.

As already mentioned, generally included in instructions stored in the memory and executable by the processor of the computing device 105 is programming for operating one or more vehicle 101 components, e.g., braking, steering, propulsion, etc., without intervention of a human operator. Using data received in the computing device 105, e.g., the sensor data from the sensors 110, the server computer 125, etc., the computing device 105 may make various determinations and/or control various vehicle 101 components and/or operations without a driver to operate the vehicle 101. For example, the computing device 105 may include programming to regulate vehicle 101 operational behaviors (i.e., physical manifestations of vehicle 101 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller, a brake controller, and a steering controller. A controller may be an electronic control unit (ECU) such as is known, possibly including additional programming as described herein. The controllers may communicatively be connected to and receive instructions from the computing device 105 to actuate the subsystem according to the instructions. For example, the brake controller may receive instructions from the computing device 105 to operate the brakes of the vehicle 101.

The one or more controllers for the vehicle 101 may include known electronic control units (ECUs) or the like including, as non-limiting examples, one or more powertrain controllers, one or more brake controllers, and one or more steering controllers. Each of the controllers may include respective processors and memories and one or more actuators. The controllers may be programmed and connected to a vehicle 101 communications bus, such as a controller area network (CAN) bus or local interconnect network (LIN) bus, to receive instructions from the computing device 105 and control actuators based on the instructions.

Sensors 110 may include a variety of devices known to provide data via the vehicle communications bus. For example, a radar fixed to a front bumper (not shown) of the vehicle 101 may provide a distance from the vehicle 101 to a next vehicle in front of the vehicle 101, or a global positioning system (GPS) sensor disposed in the vehicle 101 may provide geographical coordinates of the vehicle 101. The distance(s) provided by the radar and/or other sensors 110 and/or the geographical coordinates provided by the GPS sensor may be used by the computing device 105 to operate the vehicle 101 autonomously or semi-autonomously, for example.

The vehicle 101 is generally a land-based vehicle 101 capable of autonomous and/or semi-autonomous operation and having three or more wheels, e.g., a passenger car, light truck, etc. The vehicle 101 includes one or more sensors 110, the V-to-I interface, the V-to-V interface, the computing device 105 and vehicle components 115 including one or more controllers. The sensors 110 may collect data related to the vehicle 101 and the environment in which the vehicle 101 is operating. By way of example, and not limitation, sensors 110 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 110 may be used to sense the environment in which the vehicle 101 is operating, e.g., sensors 110 can detect phenomena such as weather conditions (precipitation, external ambient temperature, etc.), the grade of a road, the location of a road (e.g., using road edges, lane markings, etc.), or locations of target objects such as neighboring vehicles 101. The sensors 110 may further be used to collect data including dynamic vehicle 101 data related to operations of the vehicle 101 such as velocity, yaw rate, steering angle, engine speed, brake pressure, oil pressure, the power level applied to vehicle components 115 in the vehicle 101, connectivity between vehicle components 115, and accurate and timely performance of vehicle components 115.

Traffic infrastructure system 100 includes a stationary sensor 130. A stationary sensor 130 includes sensors 135. Sensors 135 can include one or more cameras, including video cameras, lidar sensors, radar sensors and ultrasound sensors. Sensors 135 are in communication with a computer 140 that can control the sensors 135 to direct the sensors 135 to acquire data and to receive the acquired sensor data. Computer 140 can process the data acquired from sensors 135 and transmit the processed or unprocessed data to server 125 or vehicle 101 via network 120.

Computer 140 can be a computer 105 as described above or may include a dedicated electronic circuit including an ASIC that is manufactured for a particular operation, e.g., an ASIC for processing sensor data and/or communicating the sensor data. In another example, computer 140 may include an FPGA which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 140.

Figure 2:
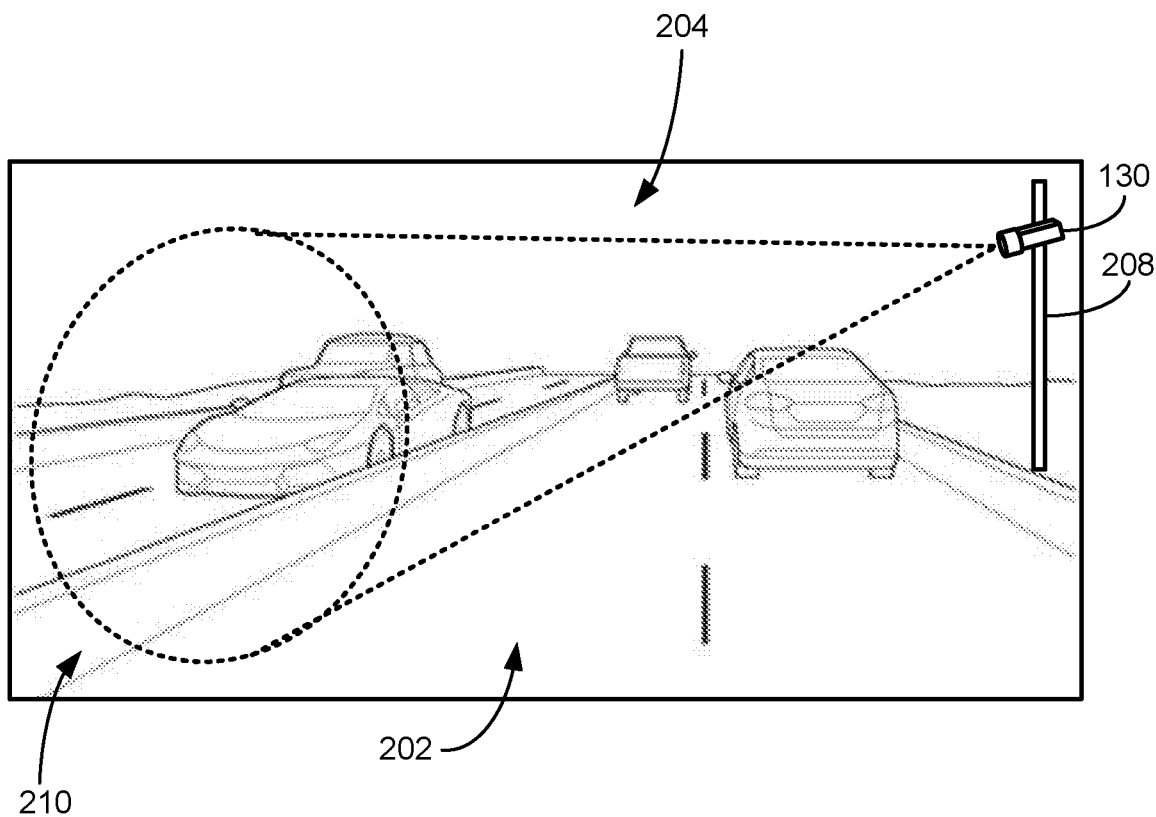
FIG. 2 is a diagram of an example vehicle with sensors.

FIG. 2 is a diagram of a traffic scene 200, i.e., an environment that includes vehicles 204, typically operating on a roadway 202. Traffic scene 200 can also include non-mobile infrastructure elements, such as a stationary sensor 130, mounted on a pole 208 to provide stationary sensor 130 with a field of view 210 that includes a portion of the roadway 202 and vehicles 204. Stationary sensor 130 can alternatively be mounted on a building, pylon, overpass, or traffic signal, for example. Stationary sensor 130 is mounted to provide a field of view 210 that includes a portion of the roadway 202 while remaining stationary with respect to the roadway 202. Stationary sensor 130 can be in communication with a computing device, such as computer 105, described above in relation to FIG. 1. Image data acquired by a stationary sensor 130 can be communicated to a computing device in a traffic infrastructure system 100 for processing to determine data regarding objects in a field of view 210 of a stationary sensor 130. Objects in a field of view 210 can include vehicles 204, pedestrians, and bicycles, etc. Data regarding objects in a field of view 210 can be communicated from a computing device in a traffic infrastructure system 100 to a computer 105 included in a vehicle 101 via a server 125, for example. Data regarding objects in a field of view 210 can be used by a computer 105 to determine a vehicle path upon which to operate a vehicle 101 that avoids contact with the objects, for example.

Stationary sensor 130 can be a video sensor that acquires image data. The image data can be red, green, blue color image data, grayscale image data, grayscale plus red hybrid image data, or infrared image data. Video sensors can acquire image data as successive frames of image data at frame rates that can range from 60 frames per second (fps) to greater than one second per frame. Alternatively, stationary sensor 130 can be a lidar sensor. Lidar sensors emit electromagnetic radiation in the visible or infrared light frequency ranges and measure the elapsed time between emission of the light, reflection off surfaces in the traffic scene 200 and return to the lidar sensor. Lidar sensors can measure the elapsed time using pulses of electromagnetic radiation or by modulating the electromagnetic radiation and measuring the phase shift of the returned radiation. A lidar sensor can electro-mechanically scan the output electromagnetic radiation in a beam to create a lidar image that includes distances to surfaces in the field of view 210. A computing device can process the lidar image to determine objects in the field of view 210, for example. Stationary sensor 130 can also include radar sensors and ultrasound sensors.

Figure 3:
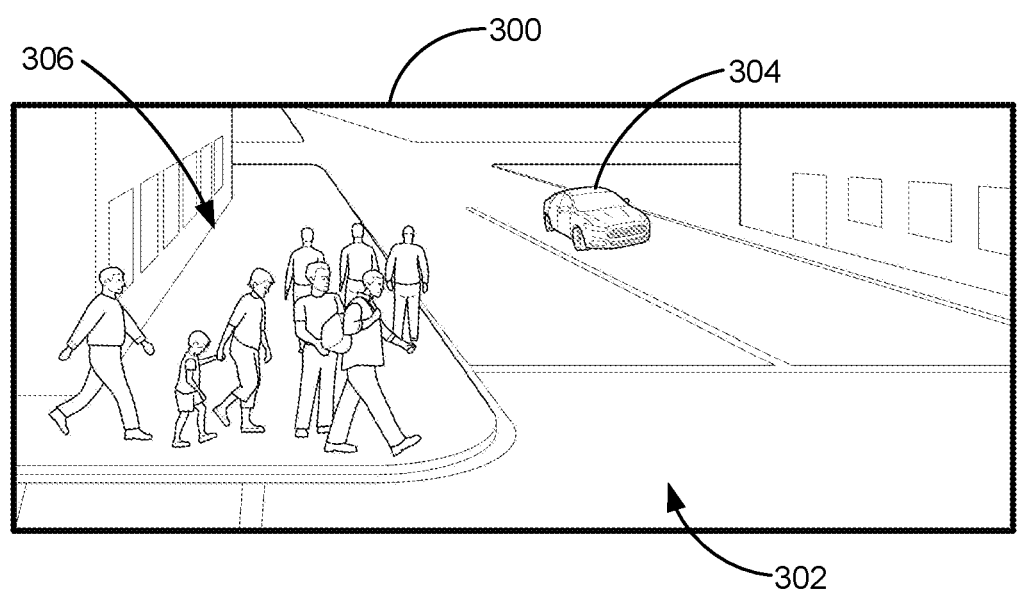
FIG. 3 is a diagram of an example traffic scene.

FIG. 3 is a diagram of an image 300 of a traffic scene, acquired by a stationary sensor 130 and rendered as a black and white line drawing to comply with Patent Office regulations. Image 300 can be a color, grayscale, hybrid or infrared video image or a lidar image. Image 300 includes a roadway 302, a vehicle 304, and pedestrians 306. Image 300 can be acquired by a stationary sensor 130 and communicated to a computing device in a traffic infrastructure system 100. The computing device can determine identities and locations for objects including a vehicle 304 and pedestrians 306 by processing the image 300 with a computing device included in a traffic infrastructure system 100.

Techniques discussed herein improve object tracking by determining object motion based on groups of objects. Object motion can be determined by providing tracking data for groups of objects based on acquiring two or more frames of image data from a stationary sensor 130. The two frames of image data can correspond to image data acquired at two time steps, where the time difference between the first time step and the second time step can correspond to a 30 fps frame rate, or about 33 milliseconds. Techniques discussed herein determine image features in both first and second images and determine groups of image features that correspond to one or more objects moving in the same direction at the same rate. The group can correspond to a single three-dimensional (3D) object like a vehicle, or a group of pedestrians moving at the same rate in the same direction. The direction and rate of movement for each group can be tracked and the tracking data downloaded to a computer 110 in a vehicle 101.

Figure 4:
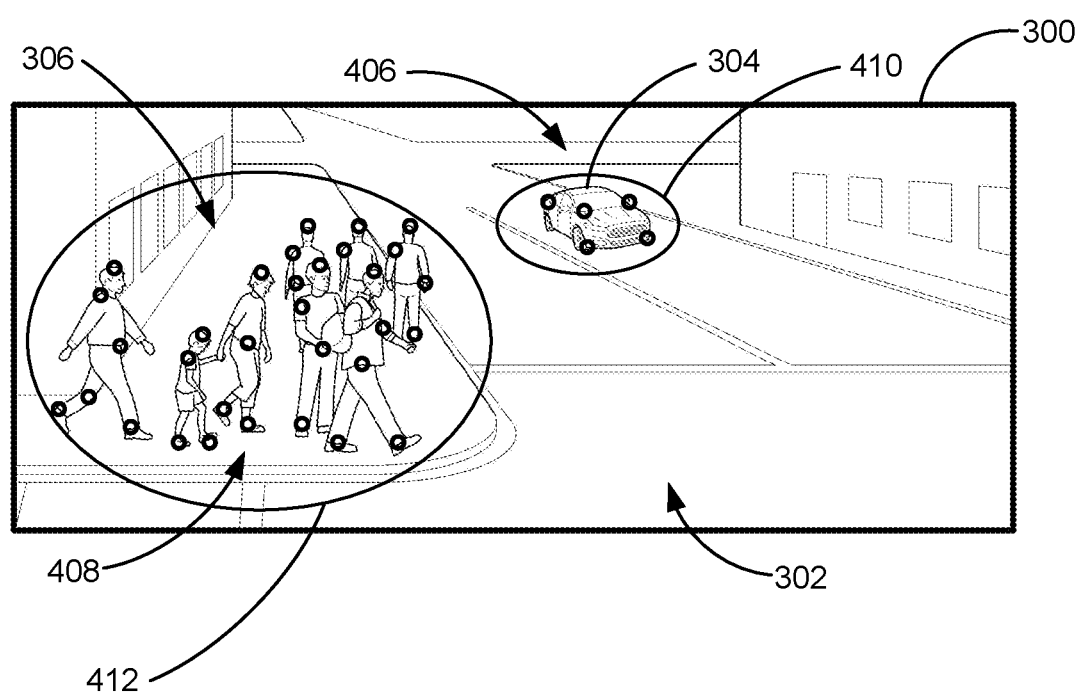
FIG. 4 is a diagram of an example traffic scene including object features.

FIG. 4 is another diagram of the image 300 of a traffic scene. Image 300 includes the roadway 302, vehicle 304 and pedestrians 306. The image 300 has been processed using a machine vision technique to determine features 406, 408, denoted by circles, corresponding to the vehicle 304 and pedestrians 306, respectively. The image processing technique used to determine features 406, 408 is ORB (oriented FAST and rotated BRIEF), a feature-detection software program available as part of the OpenCV library of machine vision software. OpenCV is a library of programming functions for real-time machine vision originally developed by Intel, (Intel Corporation, Santa Clara, Calif. 95054) and currently supported by the OpenCV organization (at the time of filing this application, found on the Internet at OpenCV.org).

ORB uses the FAST feature detector to detect corner features and determine an orientation of the corner features to determine features 406, 408. FAST is defined as "features from accelerated segment test" and extracts features 406, 408 from an image based on determining edges and corners in image data. Image data is processed as a two-dimensional array of pixel values corresponding to grayscale, color or distance values. FAST detects features 406, 408 based on differences in pixel values being greater than a threshold. The threshold can be empirically determined by processing a sample image and selecting a threshold that yields a user-determined number of features 406, 408 based on the number of features a user would expect, based on visually inspecting a sample image. Features 406, 408 are determined by detecting pixels in the center of a radius three circle that are adjacent to a user-selected number of contiguous lighter or darker pixels (e.g. edges). The number of contiguous lighter or darker pixels is empirically selected based on a sample image to yield a desired number of features 406, 408. Once the raw features are detected by the FAST algorithm, the BRIEF (binary robust independent elementary features) algorithm is used to form binary feature descriptors for each feature 406, 408 that can be used to match features between images, for example. In image 300 the output from ORB is illustrated by circles corresponding to features 406, 408.

Techniques described herein then form clusters 410, 412 of features 406, 408 by calculating a function based on distances between features 406, 408 in a first frame of image 300 data from corresponding features 406, 408 in a frame of image 300 data acquired at a second time step. The two time steps can be separated by about 33 milliseconds (assuming 30 fps) as discussed above. Corresponding features 406, 408 between first and second images 300 can be determined using a KNN (k-nearest neighbor) algorithm. In this example we will assume k=2. The value of k can be selected based on the number of neighboring features expected to be in the same group as a selected feature, as determined by examining sample images. For each feature x in a first frame, calculate a distance between the x, y location of the feature x and the two closest features (y and z) in a second frame. Add the pair x and y to a list of corresponding features if dist(x, y)/dist(x, z)<0.8, where dist(a, b) is the Euclidian distance between vectors a and b. All features that do not move between the first frame and the second frame are labeled as background features and removed from the list of features 406, 408. Processing features 406, 408 using a KNN algorithm yields distances between corresponding features 406, 408 in two successive image 300 acquired at first and second time steps.

Following distance calculations, features 406, 408 are processed to form clusters using a MEANSHIFT algorithm to create n clusters of features 406, 408. A MEANSHIFT algorithm forms clusters of features 406, 408 based on a minimum cluster size and a maximum distance between features 406, 408 in the first and second images 300. A MEANSHIFT algorithm determines a probability density function based on the distribution of distances and detects local maxima or modes in the probability density function corresponding to the distribution of distances of subsets of features that satisfy the minimum number and maximum distance constraints. The minimum number and maximum distance constraints can be use selected based on empirical studies of sample pairs of images 300 to correctly form clusters that agree with a user's expectation. For example, the minimum number of features and the maximum distance can be selected to form clusters 410, 412 corresponding to a vehicle 304 and pedestrians 306 in image 300. The MEANSHIFT algorithm then determines which features 406, 408 correspond to which objects in image 300 by assigning the features 406, 408 to clusters 410, 412 based on the modes of the distributions of distances between a first image 300 and a second image 300.

Figure 5:
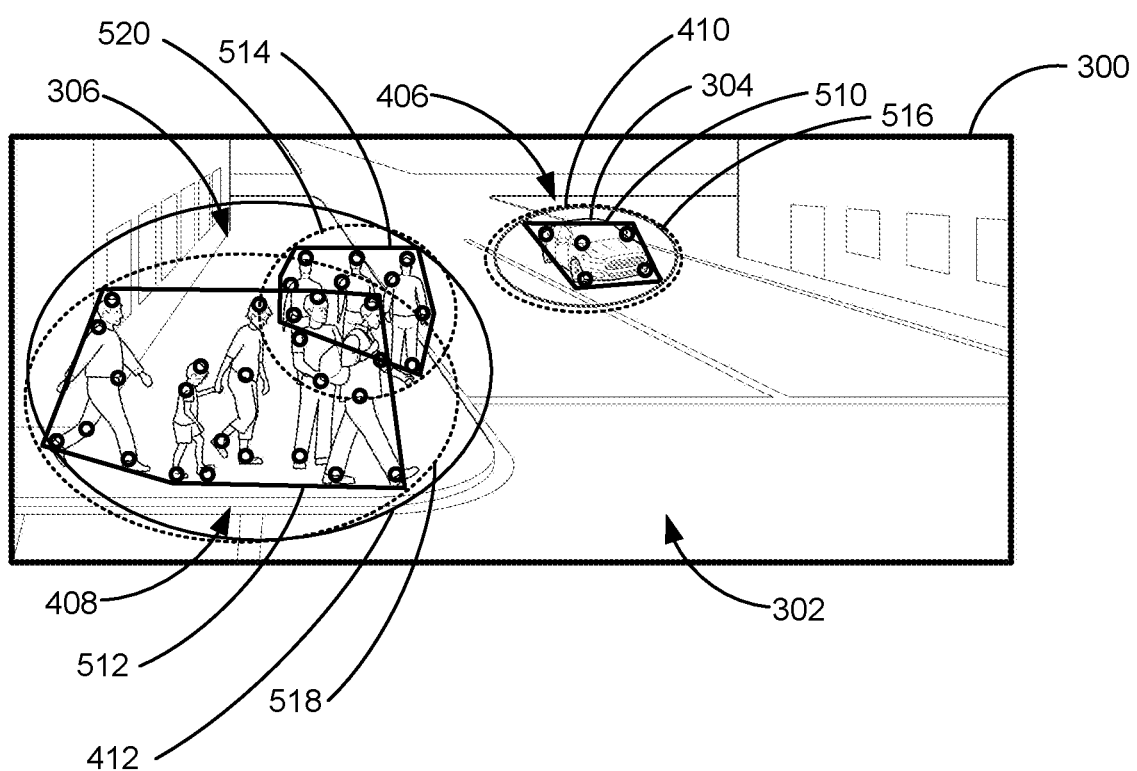
FIG. 5 is a diagram of an example traffic scene including clustered object features.

FIG. 5 is another diagram of the image 300 of a traffic scene. Image 300 includes the roadway 302, the vehicle 304 and pedestrians 306. The image 300 includes features 406, 408, denoted by circles, corresponding to the vehicle 304 and pedestrians 306 as described above in relation to FIG. 4, above. The features 406, 408 are further processed as described in relation to FIG. 4 to form clusters 410, 412, which are lists of features 406, 408 that are within a maximum distance to each other and moving about the same distance between a first and second image 300. Techniques described herein further process the features 406, 408 included in clusters 410, 412 based on a similarity transform to classify features 406, 408 into groups. The groups are based on the consistency of movement of the features 406, 408 between a first frame and a second frame of image 300 data acquired at a first time step and a second time step, respectively, as described below using a RANSAC algorithm.

Features 406, 408 in clusters 410, 412 are assigned to a group using a RANSAC (random sample consensus) algorithm. A RANSAC algorithm divides features 406, 408 from a single cluster 410, 412 into one or more groups based on based on similarity transformations. A similarity transformation (or transform) is a mathematical operation that determines translation, rotation and scale parameters that transform a subset of features 406, 408 from a first image 300 into a second image 300. The similarity transformation can be defined based on translation, rotation, and scale according to the equation:

$$\begin{pmatrix} x' \\ y' \\ 1 \end{pmatrix} = \begin{bmatrix} s\cos\theta & -s\cos\theta & t_x \\ s\sin\theta & s\cos\theta & t_y \\ 0 & 0 & y \end{bmatrix} \begin{pmatrix} x \\ y \\ 1 \end{pmatrix} \quad (1)$$

Where x and y are the pixel coordinates of the feature 406, 408 in the first image 300, x' and y' are the pixel coordinates of the feature 406, 408 in the second image 300, s is the scale factor between images. $t_x$ and $t_y$ are the translations in the x and y directions respectively and $\theta$ is the rotation. Taken together, the Euclidian transform (translation, rotations) and scale factors equal four degrees of freedom (DOF). Invariants under this type of similarity transformation are angles between lines, ratios of lengths of lines, and ratios of areas, meaning, for example, that parallel lines remain parallel. This permits the similarity transform to preserve structures, defined as shapes of groups of features 406, 408. For example, sets of features 406, 408 corresponding to a vehicle 304 and pedestrians 306 will be transformed into sets of features 406, 408 having a similar shape and orientation.

Because the features 406, 408 in first and second images 300 were acquired with a small (33 milliseconds) time step between the images 300, the rotation $\theta$ should be very small and the scale factor s should be between 0 and 2, so that 0<s<2. This will typically preserve orientation and size between first and second images 300. If 0<s<1, the size of a bounding convex hull corresponding to a group is shrinking, meaning, for example, that the pedestrians are moving away from the stationary sensor 130. If 1<s<2 the group is expanding, meaning, for example, that the pedestrians in the group are moving closer to the stationary sensor 130. Based on the similarity transform between first and second images 300, for each feature 406, 408 in the first and second images 300, a mean average reprojection error can be determined based on the average distance between corresponding features 406, 408. The similarity transform can define a group of features 406, 408, and therefore the objects to which the features 406, 408 correspond, as features 406, 408 moving in the same direction at the same speed. According to this definition, one or more pedestrians moving in the same direction at the same rate can be defined as a single group.

The RANSAC algorithm determines consistency of movement of a group of image features by iteratively determining a similarity transform S which measures the motion of a subset of features. A group of image features is defined as a subset of a cluster of image features. The first iteration of the RANSAC algorithm starts by selecting four random features 406, 408 in a first frame of image 300 data from a cluster 410, 412. Similarity transforms are calculated between the four selected features 406, 408 and their corresponding features 406, 408 in a second frame. The RANSAC algorithm iterates on the features 406, 408 of a cluster 410, 412, selecting a different random sample of four different features 406, 408 each time and calculating a new similarity transform S for the four features 406, 408. The RANSAC algorithm then determines how many of the features 406, 408 in the cluster 410, 412 match this similarity transform S. The matching is performed by transforming the pixel location of a feature 406, 408 from a first image 300 to a second image 300 based on the similarity transform S. The location of the transformed feature 406, 408 is compared to the location of the corresponding feature 406, 408 from the second image 300 to determine if they match to within a user-selected tolerance. A match is defined as a Euclidian distance of the transformed location of the feature 406, 408 from the first image 300 from the location of the corresponding feature 406, 408 in the second image 300. If the Euclidian distance of the transformed location of the feature 406, 408 is within a user-selected tolerance of the location of the corresponding feature 406, 408 in the second image, the feature 406, 408 is labeled as an "inlier". The user-selected tolerance is typically less than one pixel and can be empirically determined by processing sample first and second images 300 to determine if the expected number of features 406, 408 match, as defined above, when transformed by a similarity transform S determined based on a random subset of features 406, 408. The expected number of features to match can be determined by user examination of the corresponding features 406, 408 in sample images.

The RANSAC algorithm keeps track of the similarity transform S and the number of inlier features 406, 408 in a Consensus data structure. The Consensus data structure is a list of inlier features 406, 408 combined with the similarity transform S that was used to determine the inlier features 406, 408. If the number of inliers>length(Consensus) for a given iteration, meaning that the number of inliers in the current iteration (the "length") is greater than the number of inliers from any previous iteration, then the Consensus data structure is updated by setting the Consensus data structure equal to the list of inliers plus the parameters of the similarity transform S that was used to select the inliers:

$$\text{Consensus} = \{\text{inlier}, S\} \quad (2)$$

When the maximum number of iterations, typically 100, is reached, the inlier features 406, 408 in the Consensus data structure are assigned to a first group. The RANSAC algorithm then repeats the process with the features 406, 408 remaining in the cluster, forming a second group. The RANSAC algorithm continues until the features 406, 408 of a cluster 410, 412 are exhausted, meaning that all of the features 406, 408 of a given cluster 410, 412 are assigned to a group. Image 300 illustrates three groups formed in this manner. The first group, illustrated by convex hull 510, is formed by features 406 in cluster 410 corresponding to vehicle 304 in image 300. The second group, illustrated by convex hull 512, is formed by a portion of features 408 included in cluster 412 corresponding to a portion of pedestrians 306 moving from left to right with respect to stationary sensor 130 in image 300. The third group, illustrated by convex hull 514, includes a portion of features 408 included in cluster 412 corresponding to a portion of pedestrians 306 moving away from stationary sensor 130 in image 300. Convex hulls 510, 512, 514 are defined as the minimum convex polyhedrons with four or more sides that encloses the features 406, 408 selected by the RANSAC algorithm as elements in the longest Consensus data structure. Because a group is indicated in image 300 by a convex hull with a minimum of four sides, the minimum number of features 406, 408 in a group is required to be four or more.

When all of the groups of features 406, 408 are assigned to groups, and each group is surrounded by a convex hull 510, 512, 514. Each group surrounded by a convex hull 510, 512, 514 can be enclosed in a best-fit ellipse 516, 518, 520 (dotted lines). A best-fit ellipse 516, 518, 520 is the smallest ellipse with major and minor axes parallel to the x and y axes of image 300 that enclose the features included in convex hulls 510, 512, 514, respectively. Ellipses 516, 518, 520 can overlap and are shaped to fit the convex hulls 510, 512, 514. Ellipses 516, 518, 520 are used to describe the groups rather than convex hulls 510, 512, 514 because ellipses have a fixed length representation, as opposed to convex hulls which can require an indefinite number of points to describe. An ellipse can be communicated to a vehicle 101 as four numbers representing the x and y pixel address of the center and pixel lengths of the major and minor axes of the ellipse.

Following determination of enclosing ellipses 516, 518, 520, a computing device in a traffic infrastructure system 100 can determine tracking data for objects in a field of view 210 of a stationary sensor 130 by acquiring and processing a time series of pairs of images 300 to determine enclosing ellipses 516, 518, 520 for objects, including pedestrians 306 and vehicles 304 over two or more time steps. By recording the movement of the center of corresponding ellipses 516, 518, 520 over two or more time periods, the direction and speed of the objects included in corresponding enclosing ellipses 516, 518, 520 can be determined as tracking data for objects included in the enclosing ellipses 516, 518, 520. The centers of the enclosing ellipses 516, 518, 520 can be processed with a particle filter, which tracks individual motions of features 406, 408 included in a group. Particle filters estimate can estimate the motion of a group of individual elements such as features 406, 408 by calculating a posterior distribution of the states of individual particles, in this example features 406, 408. Calculating a posterior distribution means calculating a probability based on including previously determined evidence. In this example the previously determined evidence includes the estimated motion of the group. Each measurement of the location of the enclosing ellipses 516, 518, 520 can be compared to an expected location determined based on an estimated speed and direction for each group of features 406, 408. The motion of the group can also be determined by applying a Kalman filter to the successive locations of the center of an enclosing ellipse 516, 518, 520. Both particle filters and Kalman filters provide smooth and consistent tracking data from potentially noisy data based on features 406, 408 that may be changing unpredictably from one image 300 to the next.

Tracking data determined by filtering grouped features 406, 408 can be communicated (e.g. downloaded) to a computing device 105 in a vehicle 101 via a server 125, for example. A computing device 105 in a vehicle 101 can process the tracking data to predict future locations of objects in an environment around the vehicle 101 by combining the pixel locations in the tracking data with data regarding the real-world location and orientation of the field of view 210 of the stationary sensor 130 with respect to the roadway 302. A computing device 105 included in a vehicle 101 can use the predicted locations transformed into real-world coordinates to determine a vehicle path upon which to operate the vehicle 101 that avoids contact with the objects described in the tracking data.

Techniques described herein determine of tracking data for objects in an environment around a vehicle 101 by determining features 406, 408 using an ORB feature detector corresponding to objects including pedestrians 306 and vehicles 304 and processing the determined features 406, 408 to determine groups of objects moving in similar directions at similar speeds using similarity transforms and a RANSAC algorithm. The determined groups can be tracked by surrounding the grouped features with convex hulls 510, 512, 514 and fitting enclosing ellipses 516, 518, 520 to the convex hulls 510, 512, 514. The enclosing ellipses 516, 518, 520 can be tracked over a time series of acquired images to determine tracking data corresponding to the objects. Tracking groups of objects in this fashion is more accurate and more efficient than tracking individual elements of a group, for example pedestrians. The tracking data can be communicated to a vehicle 101 and used to operate the vehicle 101.

Figure 6:
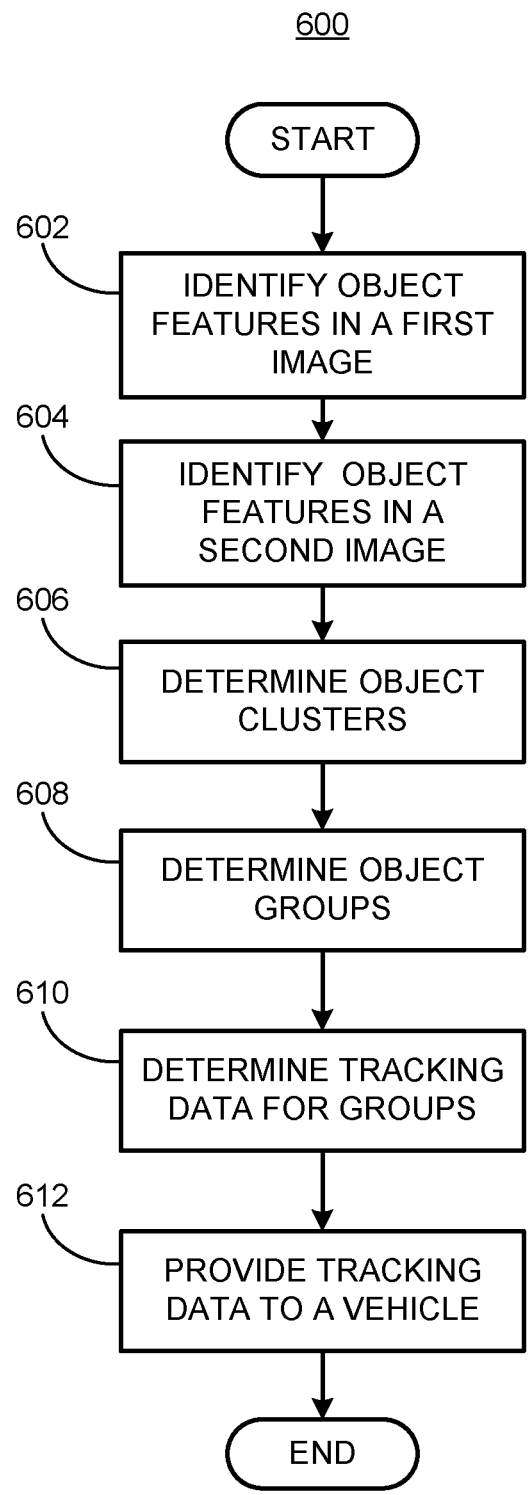
FIG. 6 is a flowchart diagram of an example process to group and track objects.

FIG. 6 is a flowchart diagram of a process 600 for providing a vehicle 101 with object tracking data. Process 600 can be implemented by a processor of a computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where a computing device included in a traffic infrastructure system 100 acquires first and second images 300 acquired at a first and second time step from a stationary sensor 130. The computing device determines features 406, 408 corresponding to objects, for example a vehicle 304 and a group of pedestrians 306 by processing the images 300 with an ORB algorithm as discussed above in relation to FIG. 4.

At block 604 the computing device forms clusters 410, 412 corresponding to the features 406, 408 by processing the features 406, 408 using a KNN algorithm to form distances between features 406, 408 in an image 300 acquired at a first time step and features 406, 408 in and image 300 acquired at a second time step. The distances are processed with a MEANSHIFT algorithm to assign the features 406, 408 from the first image 300 to clusters 410, 412 corresponding to features 406, 408 satisfying both minimum number and maximum distance constraints. The minimum number and maximum distance constraints can be user selected to yield a number of clusters that agrees with user expectation on sample images 300.

At block 606 the computing device processes the clusters 410, 412 to form groups using a RANSAC algorithm to divide the clusters 410, 412 into groups based on a similarity transform. The similarity transform determines the translation, rotation, and scale required to transform random subsets of features 406, 408 from an image 300 acquired at a first time step into corresponding features 506, 408 in an image 300 acquired at a second time step. The RANSAC algorithm divides clusters 410, 412 into groups corresponding to objects moving at the same speed in the same direction. The groups are identified by surrounding the features 406, 408 of each group with a convex hull 510, 512, 514.

At block 608 the convex hulls 510, 512, 514 corresponding to the groups of features 406, 408 are each enclosed in a minimally enclosing ellipse 516, 518, 520. The minimally enclosing ellipse identifies each group with a center, a major axis and a minor axis. This permits each group to be communicated to a vehicle in a fixed-length data structure. The objects corresponding to each group can be tracked by determining enclosing ellipses for the groups in a plurality of pairs of images acquired over a time period and tracking grouped features 406, 408 over a time series of images 300. The grouped features can be tracked using either a particle filter or Kalman filtering to produce smooth, consistent tracking data. This tracking data can be provided to a computer 105 included in a vehicle 101 to permit the computer 105 to determine a vehicle path. The computer can use the tracking data to predict future locations of objects in an environment around the vehicle 101. The vehicle 101 can be operated upon a vehicle path that avoids future locations of the object. Following block 806 process 800 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a computing device including:
   a processor; and
   a memory, the memory including instructions executable by the processor to:
      identify first object features from sensor data acquired by a stationary sensor at a first time step;

determine second object features at a second time step;
determine distances measured in pixels between the first object features and corresponding second object features and compare the distances to one or more mean distances;
determine a plurality of similarity transformations between a plurality of random samples of first object features and a plurality of random samples of second object features based on maximizing a number of first object features and second object features included in the plurality of similarity transformations, wherein the similarity transformations include translation, rotation, and scaling that transforms of the one or more first object features into the one or more second object features;
determine a first object cluster and a second object cluster based on the plurality of similarity transformations;
determine tracking data for the first object cluster and the second object cluster based on a location of the first object cluster and a location of the second object cluster; and
provide the tracking data to a vehicle.

2. The system of claim 1, wherein the sensor data includes video data and lidar data.

3. The system of claim 1, wherein a time difference between the first time step and the second time step is based on a video frame rate.

4. The system of claim 1, wherein the one or more object clusters correspond to one or more pedestrians or one or more vehicles.

5. The system of claim 1, the instructions including further instructions to determine the first object features and the second object features by processing sensor data with an oriented FAST and rotated BRIEF (ORB) feature detector, wherein the ORB feature detector is a machine vision technique that includes detecting corner features and determining an orientation for the corner features.

6. The system of claim 1, the instructions including further instructions to determine the object cluster by calculating a k-nearest neighbor algorithm on the distances, wherein the k-nearest neighbor algorithm assigns an object feature to the object cluster based on its distance and nearest neighbor.

7. The system of claim 1, the instructions including further instructions to determine the object cluster based on a minimum cluster size and a maximum distance between first and second object features.

8. The system of claim 1, the instructions including further instructions to determine the locations of the one or more object clusters by determining one or more convex hulls for the first object clusters and fitting enclosing ellipses to the convex hulls.

9. The system of claim 8, the instructions including further instructions to determine tracking data for the object features by determining locations of the enclosing ellipses in successive frames of sensor data and filtering the locations with one or more of a particle filter or a Kalman filter.

10. The system of claim 1, wherein the tracking data for the one or more object groups is downloaded to a second computing device included in the vehicle.

11. The system of claim 10, wherein the tracking data for the one or more object groups is used to by the second computing device to operate the vehicle.

12. The system of claim 11, wherein operating the vehicle includes using the tracking data to predict locations for the one or more object groups and operating the vehicle to avoid contact with the one or more object groups.

13. The system of claim 1, the instructions including further instructions to:
determine a plurality of first object clusters and a plurality of corresponding second object clusters based on the plurality of similarity transformations; and
determine tracking data for the plurality of first object clusters and a plurality of corresponding second object clusters based on locations of the plurality of first object clusters and locations of the plurality of corresponding second object clusters.

14. A method, comprising:
identifying first object features from sensor data acquired by a stationary sensor at a first time step;
determining second object features at a second time step;
determining distances measured in pixels between first object features and corresponding second object features and comparing the distances to one or more mean distances;
determining a plurality of similarity transformations between a plurality of random samples of first object features and a plurality of random samples of second object features based on maximizing a number of first object features and second object features included in the plurality of similarity transformations, wherein the similarity transformations include translation, rotation, and scaling that transforms the one or more first object features into the one or more second object features;
determine a first object cluster and a second object cluster based on the plurality of similarity transformations;
determining tracking data for the first object cluster and the second object cluster based on a location of the first object groups cluster and a location of the second object cluster; and
providing the tracking data to a vehicle.

15. The method of claim 14, wherein the sensor data includes video data and lidar data.

16. The method of claim 14, wherein a time difference between the first time step and the second time step is based on a video frame rate.

17. The method of claim 14, wherein the one or more object clusters correspond to one or more pedestrians or one or more vehicles.

18. The method of claim 14, further comprising determining the first object features and the second object features by processing sensor data with an oriented FAST and rotated BRIEF (ORB) feature detector, wherein the ORB feature detector is a machine vision technique that includes detecting corner features and determining an orientation for the corner features.

19. The method of claim 14, further comprising determining the object cluster by calculating a k-nearest neighbor algorithm on the distances, wherein the k-nearest neighbor algorithm assigns an object feature to the object cluster based on its distance and nearest neighbor.

20. The method of claim 14, further comprising:
determining a plurality of first object clusters and a plurality of corresponding second object clusters based on the plurality of similarity transformations; and
determining tracking data for the plurality of first object clusters and a plurality of corresponding second object clusters based on locations of the plurality of first object clusters and locations of the plurality of corresponding second object clusters.

* * * * *

UNITED STATES PATENT AND TRADEMARK OFFICE
CERTIFICATE OF CORRECTION

PATENT NO. : 11,403,856 B2
APPLICATION NO. : 17/003301
DATED : August 2, 2022
INVENTOR(S) : Mostafa Parchami et al.

It is certified that error appears in the above-identified patent and that said Letters Patent is hereby corrected as shown below:

In the Claims

Claim 1, Column 15, Line 13:  delete "of" after --transforms--

Claim 14, Column 16, Line 34:  delete "groups" after --object--

Signed and Sealed this
Twenty-fifth Day of October, 2022

Katherine Kelly Vidal
*Director of the United States Patent and Trademark Office*